United States Patent [19]
Cooper

[11] 3,747,474
[45] July 24, 1973

[54] CONTROLLED ACCELERATION EJECTOR PISTON

[75] Inventor: Guy F. Cooper, Ventura, Calif.

[73] Assignee: The United States of America as represented by the Secretary of the Navy, Washington, D.C.

[22] Filed: Aug. 23, 1971

[21] Appl. No.: 173,773

[52] U.S. Cl.................. 91/422, 91/435, 137/38
[51] Int. Cl................. F15b 11/04, F15b 13/04
[58] Field of Search.............. 91/28, 422, 222, 91/435, 441, 442, 468; 137/539, 38, 48

[56] References Cited
UNITED STATES PATENTS

| | | | |
|---|---|---|---|
| 3,317,250 | 5/1967 | Martin, Jr. et al. | 303/24 |
| 3,572,634 | 3/1971 | Haviland | 254/2 B |
| 1,104,201 | 7/1914 | Lenzi | 137/38 X |
| 1,812,533 | 6/1931 | Hunt | 91/435 X |
| 3,002,528 | 10/1961 | Leissner | 137/539 |
| 3,100,495 | 8/1963 | Boler et al. | 137/38 |
| 3,303,749 | 2/1967 | Ocule | 91/422 X |
| 3,521,652 | 7/1970 | Reeks | 137/38 |

FOREIGN PATENTS OR APPLICATIONS

| | | | |
|---|---|---|---|
| 67,578 | 10/1957 | France | 91/422 |

Primary Examiner—Irwin C. Cohen
Attorney—Richard S. Sciascia, Joseph M. St. Amand et al.

[57] ABSTRACT

A fluid actuated piston having built in fluid flow control means in the form of a normally closed valve member of substantial mass. Inertia of the valve mass causes momentary opening of the valve during high accelerations of the piston and a spring closes the valve upon piston deceleration. The effect is to permit some loss of fluid through an exit passage during piston movement and hence to allow variation in the force applied to the piston by changes in spring rate, valve member mass and exit passage dimensions.

1 Claim, 3 Drawing Figures

PATENTED JUL 24 1973 3,747,474

CONTROLLED ACCELERATION EJECTOR PISTON

BACKGROUND OF THE INVENTION

The invention relates to pistons and more particularly to a controlled acceleration ejector piston for use with piston ejectors for ejecting an air launched payload from an aircraft.

Heretofore, gas actuated ejector mechanisms did not have self-regulating provisions which vary the gas pressure driving a piston to accommodate varying loads on the payload or varying aircraft accelerations and flexures. The result was that the payload separation dynamics deviate unpredictably from the desired dynamics. The ejector piston force histories could be preset during ground testing by varying the sizes of orifices in the gas supply lines, but there was no variation possible during the brief interval of the actual piston stroke. The variations in payload separation dynamics was particularly noticeable on flexible structures such as a multiple ejector rack where the impulse imparted to a payload varied greatly depending upon the position of the payload on the rack, the loading conditions of other stations on the rack, and the station release sequence during a salvo release.

SUMMARY OF THE INVENTION

The controlled acceleration ejector piston of the present invention is intended to provide a constant preset acceleration to a mechanical load such as an air launched payload. This preset acceleration of the payload is relative to inertial space and is to occur during the stroke of the piston independent of air loads on the payload and independent of accelerations of the ejector mechanism due to either accelerations of the aircraft or compliance of the structure between the ejector mechanism and the aircraft or a combination of both within certain limtis. In other words, the present piston is intended to afford some degree of isolation of the separation dynamics of a payload from those environmental factors of air loads and aircraft acceleration and structural flexure which are both unpredictable and variable from flight to flight. The piston is intended as an improvement over the solid pistons presently used in double and single piston ejectors now on aircraft without any other modification to such ejectors. Also, the pistons of the invention can be individually set for a desired range of acceleration without otherwise modifying an ejector.

It is an object of the invention to provide a controlled acceleration piston.

A further object of the invention is to create a piston for an ejector mechanism to provide a constant preset acceleration to a mechanical load relative to inertial space independent of air loads on the load and independent of accelerations of the ejector mechanism.

Other objects, advantages and novel features of the invention will become apparent from the following detailed description of the invention when consideration in conjunction with the accompanying drawings wherein:

DESCRIPTION OF THE PREFERRED EMBODIMENTS

Figure 1:
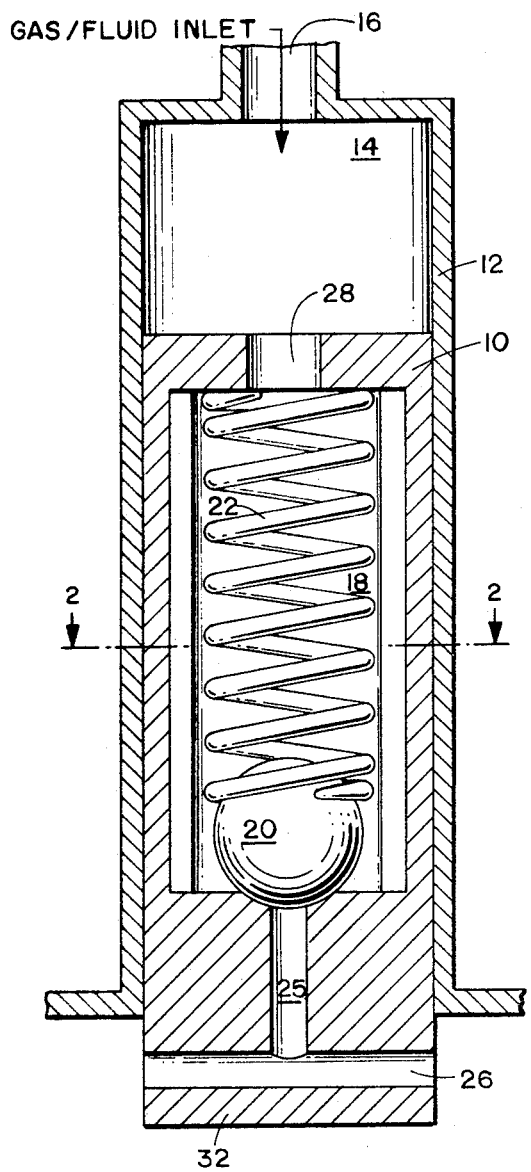
FIG. 1 is a cross-sectional elevation of a piston of the present invention substantially along the cylindrical axis thereof, and showing the ball-valve seated.

The principal components of the piston of this invention are shown in the drawings, wherein like reference numerals refer to like parts in each of the figures. A piston 10 which closely fits within a piston cylinder 12 is operable to slideably move therein due to pressure of gas or other suitable fluid entering chamber 14 of the piston cylinder via inlet aperture 16.

Figure 3:
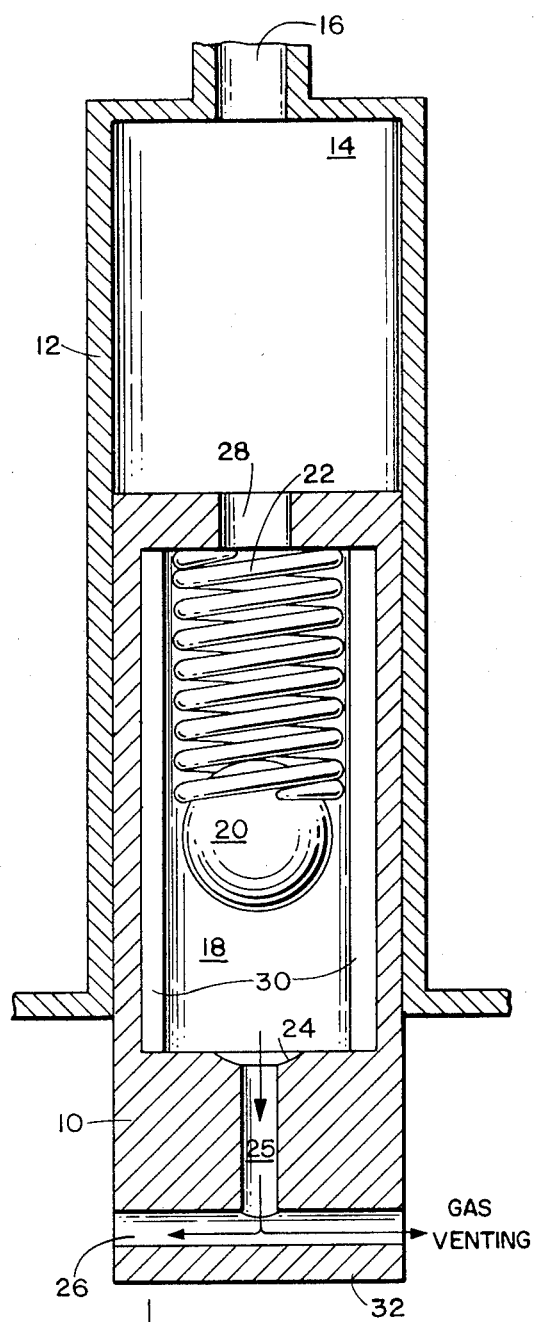
FIG. 3. is a cross-sectional view as in FIG. 1 with the piston driven downward and the ball-valve unseated.
Figure 2:
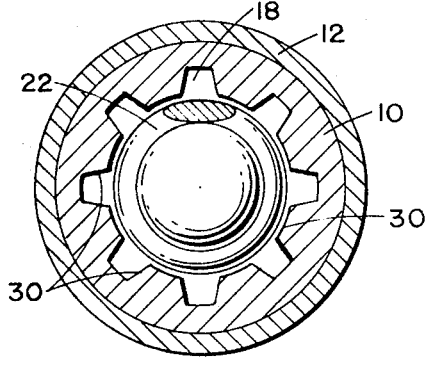
FIG. 2 is a cross-sectional view taken along the line 2—2 of FIG. 1.

Piston 10 includes a fluted chamber 18 therein which houses a ball-valve 20, of steel or the like, and compression spring 22. In its static condition as shown in FIG. 1, spring 22 holds a ball-valve 20 against the ball-valve seat 24 to prevent passage of gas through vent hole 25 and vent passageway 26 at the lower end of piston 10. Aperture 28 at the upper end of piston 10 allows passage of the driving gas from the piston cylinder chamber 14 into fluted chamber 18 within the piston. The vertical webs 30, which run axially along the wall of chamber 18 inside the piston, hold ball 20 and spring 22 in a central position, as can be seen in FIG. 2. This allows gas to flow around the sides of the ball when it is unseated to permit venting, as shown in FIG. 3.

Obviously many modifications and variations of the present invention are possible in the light of the above teachings. It is therefore to be understood that within the scope of the appended claims the invention may be practiced otherwise than as specifically described.

OPERATION

As piston 10 accelerates downward in its cylinder 12 due to gas pressure, ball 20, being of steel and therefore of significant mass and which is seated in the ball-valve seat 24, produces a reaction force which is opposed by both the compression spring 22 and the gas pressure. If the piston acceleration is sufficient, this reaction force will overcome the gas and spring force combined and permit ball 20 to lift off its seat thus venting some of the driving gas via passage 26. This will lessen the pressure of the gas in cylinder 12 and thereby lessen the acceleration of piston 10 whereupon ball 20 will reseat. In this manner the gas pressure is regualted and in turn a modification of the upper limit of piston acceleration is made. By control of the spring rate, the ball mass, the diameter of vent hole 25 in the ball-valve seat, and the flow coefficients of the vent passageway 26 the piston acceleration may be "tailored" for a given ejector/gas supply/payload combination.

The primary advantage of this invention is to permit adjustment of the force applied by the piston foot 32 to a load during the piston stroke in order that the load separates with a more predictable separation trajectory inspite of unpredictable environmental conditions present during the launch. This self-regulating feature is built within the piston itself so that pistons of this type can be substituted for the previous type used for payload ejectors; no other modification need be made to existing ejector mechanisms. The internal components of the piston arranged for this purpose are new. The mass acting as the seating valve need not be a spherical ball but can instead by a tapered valve shape to give some desired vent mass flow rate versus inertial acceleration relationship.

What is claimed is:

1. A controlled acceleration fluid actuated piston for providing a constant preset acceleration to a mechanical load, comprising:
   a. a piston cylinder chamber having one closed end and one open end;
   b. a piston operable to slidably fit within the open end of said piston cylinder chamber and having the head end of said piston normally disposed toward the closed end of said cylinder chamber and the foot thereof toward the open end of said cylinder chamber;
   c. an inlet aperture in the closed end of said piston cylinder chamber through which a suitable fluid under pressure can be allowed to enter to drive said piston in a direction away from said closed end;
   d. a self-regulating fluid flow control means within said piston and which operates to vary the fluid pressure applied to drive said piston during high acceleration thereof to accommodate variations in forces applied to the load, said self-regulating flow control means comprising:
      1. a hollow chamber within said piston;
      2. an opening in the piston head to admit passage of said drive fluid into said chamber;
      3. a limited exit passage within said piston for permitting some of said fluid to pass through said piston during high acceleration;
      4. a valve seat and a valve hole at the foot end of said chamber connected to said limited exit passage;
      5. a valve member of substantial inertial mass normally seated in said valve seat;
      6. a spring member for normally holding said valve member seated in said valve seat in a closed position;
   e. the inertial of said self-regulating fluid flow control means valve member causing momentary unseating thereof and opening of said valve hole during high accelerations of the piston to afford a degree of isolation from any other forces on said mechanical load due to environmental factors relative to inertial space during the stroke of the piston that would otherwise effect the constant preset acceleration imparted thereto, and said spring member causing said valve member to reseat upon piston deceleration for closing said valve hole;
   f. said hollow chamber within said piston is a cylindrical axially fluted chamber positioned therein having vertical webs which run axially along the wall of said chamber, said webs keeping the valve and spring members in a central position while allowing gas to flow around the sides thereof when the valve is open;
   g. some loss of said fluid through said exit passage being permitted during high acceleration of the piston allowing variation in the force applied to said piston by changing the spring rate, valve member mass, and valve hole and exit passage dimensions.

* * * * *